(12) United States Patent
Chin et al.

(10) Patent No.: US 7,613,470 B2
(45) Date of Patent: Nov. 3, 2009

(54) REPEAT DEALING IN WIRELESS NETWORKS TO BUSY CALLED PARTIES

(75) Inventors: Frances Mu-Fen Chin, Naperville, IL (US); Paul C. Mui, Countryside, IL (US); Alok Sharma, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 90 days.

(21) Appl. No.: 11/071,481

(22) Filed: Mar. 3, 2005

(65) Prior Publication Data

US 2006/0199571 A1 Sep. 7, 2006

(51) Int. Cl.
*H04B 1/38* (2006.01)
*H04M 3/42* (2006.01)

(52) U.S. Cl. .................. 455/460; 455/564; 379/209.01
(58) Field of Classification Search .................. 455/460, 455/564
See application file for complete search history.

(56) References Cited

U.S. PATENT DOCUMENTS 5,504,804 A * 4/1996 Widmark et al. ........... 455/63.2
5,950,128 A * 9/1999 Ghisler ..................... 455/426.1
5,995,848 A * 11/1999 Nguyen ...................... 455/528
6,477,364 B1 * 11/2002 Otake ....................... 455/414.1
6,731,937 B1 * 5/2004 Spinner ...................... 455/445
6,826,402 B1 * 11/2004 Tran .......................... 455/438

* cited by examiner

*Primary Examiner*—Nick Corsaro
*Assistant Examiner*—Joel Ajayi
(74) *Attorney, Agent, or Firm*—Duft, Bornsen & Fishman, LLP

(57) ABSTRACT

A wireless network is disclosed that provides repeat dialing to busy called parties. The wireless network includes an originating MSC system that serves a calling party, and a terminating MSC system that serves a called party. The calling party initiates a call to the called party through the originating MSC system, and the terminating MSC system determines that the called party is busy on another call. The originating MSC system then receives a repeat dialing instruction from the calling party and transmits a repeat dialing indicator to the terminating MSC system. The terminating MSC system identifies when the called party becomes available in substantially real time. When available, the terminating MSC system attempts to set up a call between the called party and the calling party.

18 Claims, 9 Drawing Sheets

REPEAT DEALING IN WIRELESS NETWORKS TO BUSY CALLED PARTIES

BACKGROUND OF THE INVENTION

1. Field of the Invention

The invention is related to the field of communication networks, and in particular, to networks and methods for implementing the feature of repeat dialing in wireless networks to called parties that are busy on a call.

2. Statement of the Problem

Telephone service providers offer many features to service subscribers. One feature offered to traditional wire line subscribers is repeat dialing of busy numbers. Assume a caller places a call to a dialed number. Within the telephone network, an originating switch receives the call and routes the call to a terminating switch for the dialed number. The terminating switch determines that the circuit for that dialed number is busy, and responds to the originating switch that the dialed number is busy. The originating switch plays busy tones to the caller. When the caller hears the busy tones, the caller hangs up the telephone. The caller then picks up the receiver on the telephone and enters a code, such as *66, into the telephone to activate the repeat dialing feature to the last-dialed number. The caller can then hang up the telephone go about other business. The telephone network attempts to set up a call to the dialed number when the dialed number becomes available.

Within the telephone network, the originating switch receives the code entered by the caller. The originating switch informs the terminating switch that repeat dialing has been activated for the dialed number. When the circuit for the dialed number becomes available, the terminating switch identifies that repeat dialing has been activated for the dialed number. The terminating switch then attempts to set up a call from the caller to the dialed number. The caller may receive a special tone indicating that the dialed number is now available.

One problem with the current repeat dialing feature is that the feature is only effectively implemented and offered for wire line telephone networks. The repeat dialing feature is not currently offered for cellular networks or other wireless networks. With the large number of mobile subscribers, wireless service providers are missing out on large revenues by not offering the repeat dialing feature.

SUMMARY OF THE SOLUTION

The invention solves the above and other related problems by providing for repeat dialing in wireless networks for called parties that are busy on other calls. Service providers can advantageously offer the repeat dialing feature to a growing number of mobile subscribers. Repeat dialing is effectively implemented by having a terminating Mobile Switching Center (MSC) system, serving a called party, identify when the called party is available. The terminating MSC system can advantageously determine when the called party is available in substantially real time. Therefore, the terminating MSC system can immediately attempt to set up a call to the called party if repeat dialing has been activated. If the called party is only available for a matter of seconds, the terminating MSC system can repeat dial the called party during that short window of availability.

One embodiment of the invention comprises a wireless network that provides repeat dialing to busy called parties. The wireless network includes an originating MSC system and a terminating MSC system. The originating MSC system serves a calling party, and the terminating MSC system serves a called party. When in operation, the calling party initiates a call to the called party. The originating MSC system receives the call, and transmits a call setup message to the terminating MSC system. The terminating MSC system determines that the called party is busy on another call. Therefore, the terminating MSC system transmits a busy message to the originating MSC system. The originating MSC system transmits the same or another busy message to the calling party.

Being "busy" may mean a number of things as illustrated by the following. First, the called party is busy if the called party is on another call and does not subscribe to call waiting. Second, the called party is busy if the called party is on another call, subscribes to call waiting, but the call waiting feature is turned off. Third, the called party is busy if the called party is already on a call waiting call. There may be other scenarios where the called party is considered "busy".

The originating MSC system receives a repeat dialing instruction from the calling party. The originating MSC system transmits a repeat dialing indicator to the terminating MSC system responsive to the repeat dialing instruction. The terminating MSC system then identifies when the called party becomes available (i.e., ends the current call). When the called party has become available, the terminating MSC system attempts to set up a call between the called party and the calling party.

The invention may include other exemplary embodiments described below.

DESCRIPTION OF THE DRAWINGS

The same reference number represents the same element on all drawings.

DETAILED DESCRIPTION OF THE INVENTION

FIGS. 1-9 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
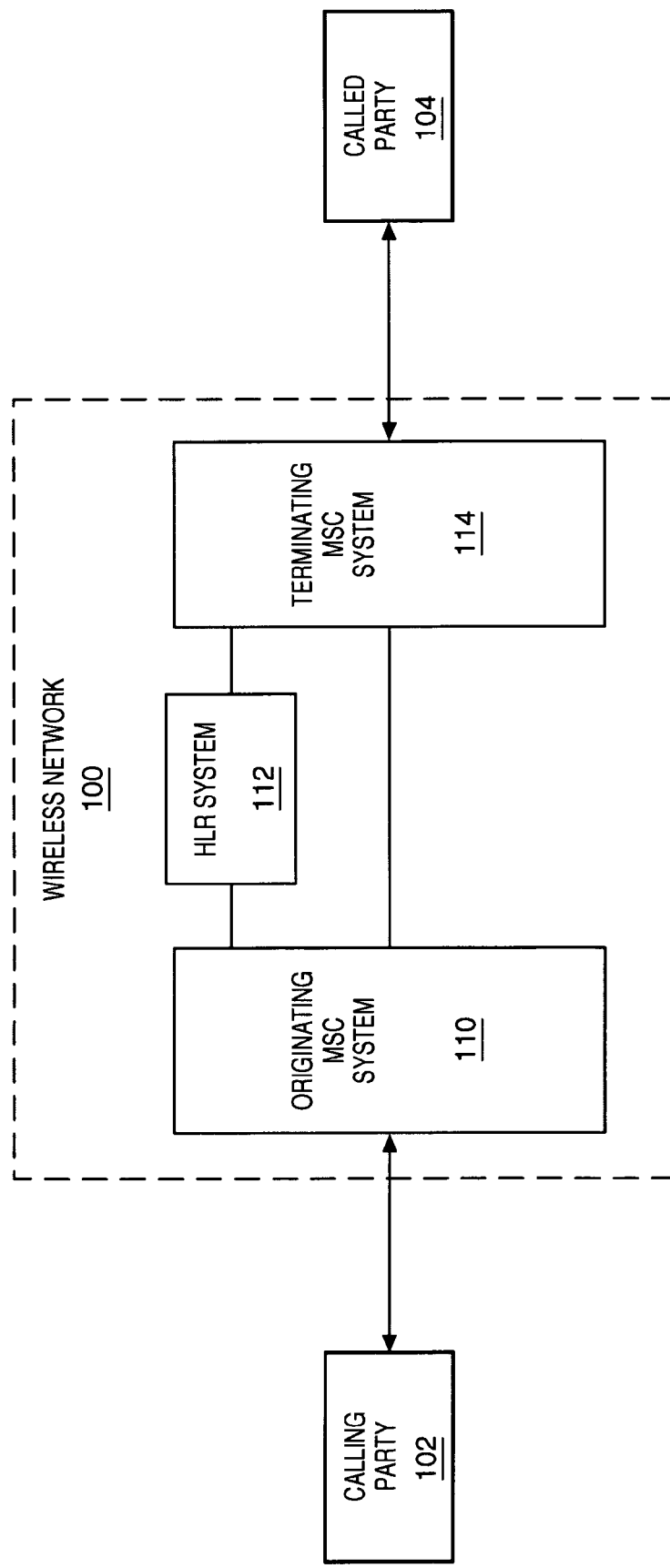
FIG. 1 illustrates a wireless network in an exemplary embodiment of the invention.

FIG. 1 illustrates a wireless network 100 in an exemplary embodiment of the invention. Wireless network 100 includes an originating Mobile Switching Center (MSC) system 110, a Home Location Register (HLR) system 112, and a terminating Mobile Switching Center (MSC) system 114. Originating MSC system 110 comprises any system that performs the functions similar to a Mobile Switching Center to originate a call in wireless network 100. HLR system 112 comprises any system that performs the functions similar to a Home Location Register for a calling party 102. There may be another HLR system (not shown) for called party 104, or called party 104 may share HLR system 112. Terminating MSC system 114 comprises any system that performs the functions similar to a Mobile Switching Center to terminate a call in wireless network 100. Originating MSC system 110 and terminating MSC system 114 may comprise the same MSC. Wireless network 100 may include other networks, systems, or devices not shown for the sake of brevity.

Originating MSC system 110 serves calling party 102. The term "calling party" may refer to a communication device and a user of the communication device. Calling party 102 may comprise a mobile calling party using a mobile communication device, such as a mobile phone, a PDA, etc, that is portable or otherwise mobile and transmits and receives messages via wireless signals. Terminating MSC system 114 serves called party 104. The term "called party" may refer to a communication device and a user of the communication device. Called party 104 comprises a mobile called party in this embodiment. However, either calling party 102 or called party 104 may comprise a wire line calling party in other embodiments.

Figure 2:
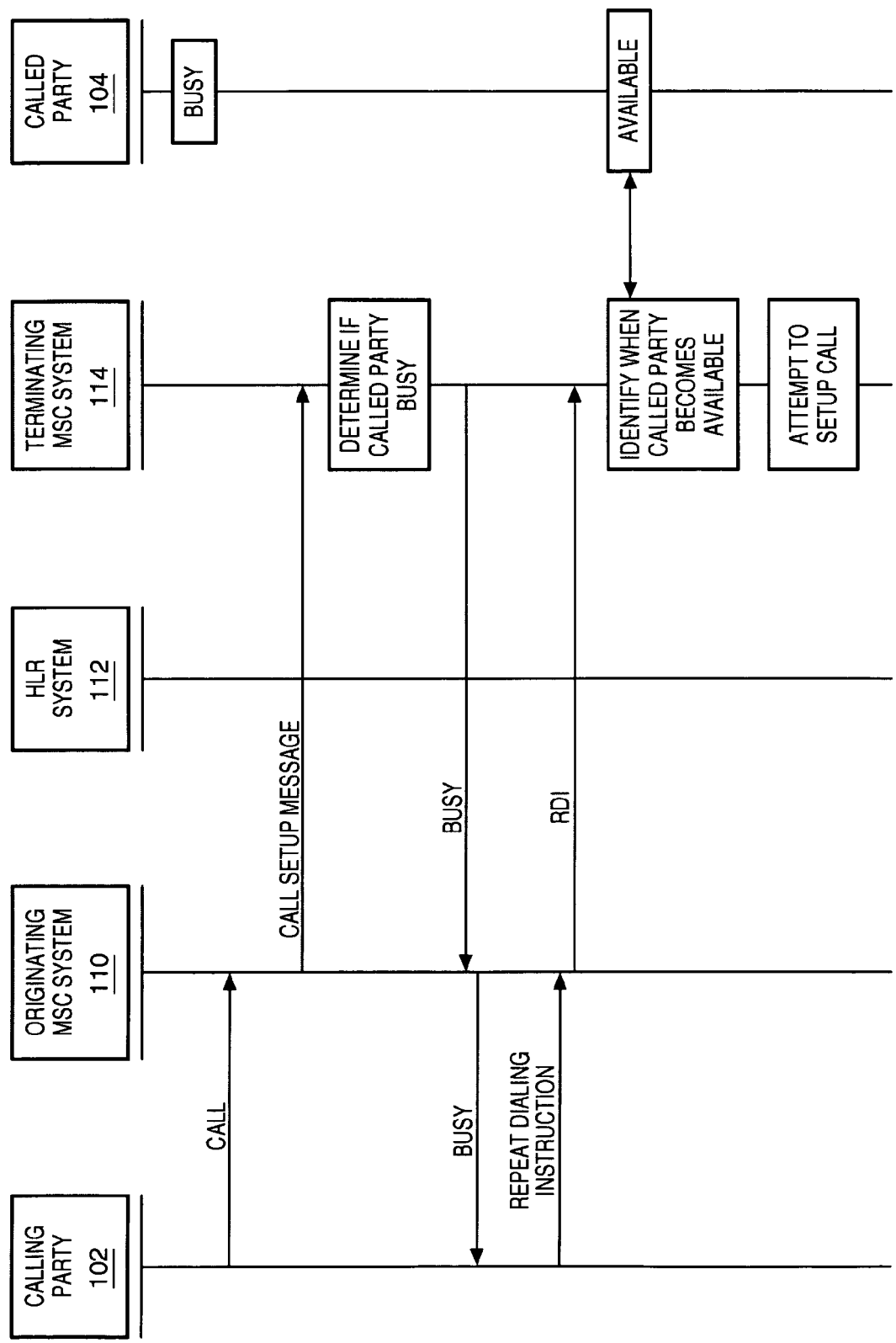
FIG. 2 is a message diagram illustrating repeat dialing in the wireless network of FIG. 1 in an exemplary embodiment of the invention.

FIG. 2 is a message diagram illustrating repeat dialing in wireless network 100 in an exemplary embodiment of the invention. Calling party 102 initiates a call to called party 104. Originating MSC system 110 receives the call. If calling party 102 subscribes to the repeat dialing feature, originating MSC system 110 may store the number dialed by calling party 102 in HLR system 112 by transmitting the dialed number to HLR system 112. HLR system 112 may then store the last-dialed number of calling party 102.

Originating MSC system 110 transmits a call setup message to terminating MSC system 114. A call setup message comprises any message used to set up or assist in setting up a call. Terminating MSC system 114 receives the call setup message, and determines that called party 104 is busy on another call. Being "busy" may mean a number of things as illustrated by the following. First, called party 104 is busy if called party 104 is on another call and does not subscribe to call waiting. Second, called party 104 is busy if called party 104 is on another call, subscribes to call waiting, but the call waiting feature is turned off. Third, called party 104 is busy if called party 104 is already on a call waiting call. Terminating MSC system 114 then transmits a busy message to originating MSC system 110. The busy message comprises any message that indicates that called party 104 is busy on another call. Originating MSC system 110 transmits the same or another busy message (or busy tones) to calling party 102.

Originating MSC system 110 then receives a repeat dialing instruction from calling party 102. Responsive to the repeat dialing instruction, originating MSC system 110 transmits a repeat dialing indicator (RDI) to terminating MSC system 114. A repeat dialing indicator comprises any data, flag, or other information that indicates that the repeat dialing feature has been activated by calling party 102. Originating MSC system 110 may also transmit a Mobile Station Identifier (MSID) for calling party 102 to MSC system 114 with the repeat dialing indicator. If calling party 102 subscribes to the repeat dialing feature, then originating MSC system 110 may retrieve the last-dialed number of calling party 102 in order to transmit the MSID.

Terminating MSC system 114 receives the repeat dialing indicator (and possibly MSID for calling party 102). Terminating MSC system 114 may store the repeat dialing indicator (and possibly the MSID for calling party 102) in a call register for called party 104. Terminating MSC system 114 then identifies when called party 104 becomes available (i.e., ends the current call). Responsive to identifying that called party 104 has become available (no longer busy on another call), terminating MSC system 114 attempts to set up a call between called party 104 and calling party 102.

Wireless network 100 advantageously provides an effective way of implementing repeat dialing to mobile devices. Because terminating MSC system 114 serves called party 104, terminating MSC system 114 is in a position to real-time monitor the availability of called party 104. Based on the real-time monitoring, terminating MSC system 114 can effectively re-dial called party 104 as soon as called party 104 ends the previous call.

Figure 3:
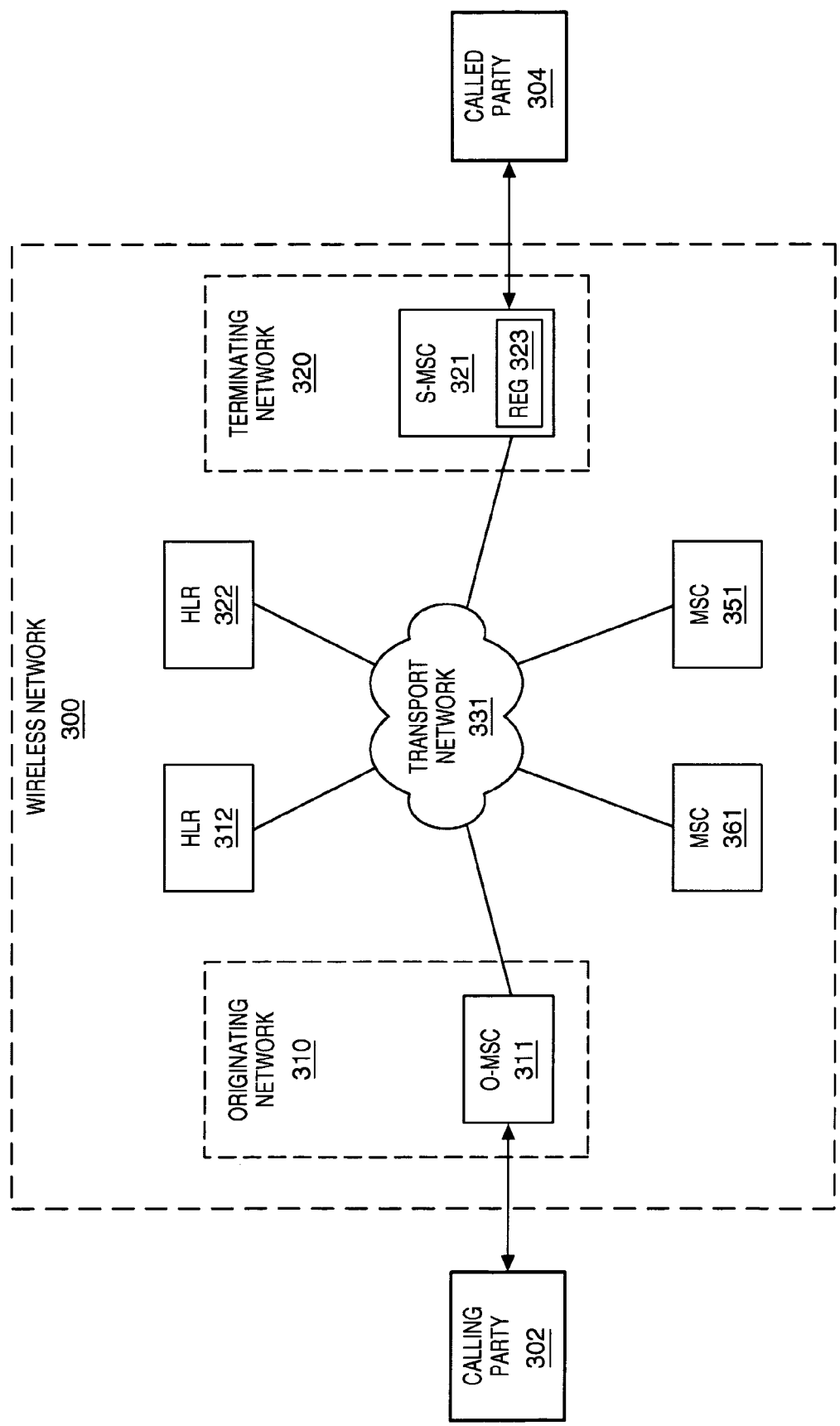
FIG. 3 illustrates another wireless network in an exemplary embodiment of the invention.

FIG. 3 illustrates another wireless network 300 in an exemplary embodiment of the invention. In FIG. 3, calling party 302 is placing a call to called party 304. Calling party 302 comprises a mobile calling party and called party 304 comprises a mobile called party. Wireless network 300 includes an originating MSC (O-MSC) 311, an HLR 312 for serving calling party 302, an HLR 322 for serving called party 304, and a serving MSC (S-MSC) 321. S-MSC 321 also includes a call register 323. O-MSC 311 is part of an originating network 310 for the call. S-MSC 321 is part of a terminating network 320 for the call. O-MSC 311, HLR 312, HLR 322, and S-MSC 321 are connected to a transport network 331. Transport network 331 may comprise a circuit-based network, a packet-based network, or a combination of the two. Wireless network 300 also includes MSC 351 and MSC 361 which will be described in FIGS. 8 and 9, respectively. Wireless network 300 may include other components, devices, or systems not shown in FIG. 3.

Activating Repeat Dialing

Figure 4:
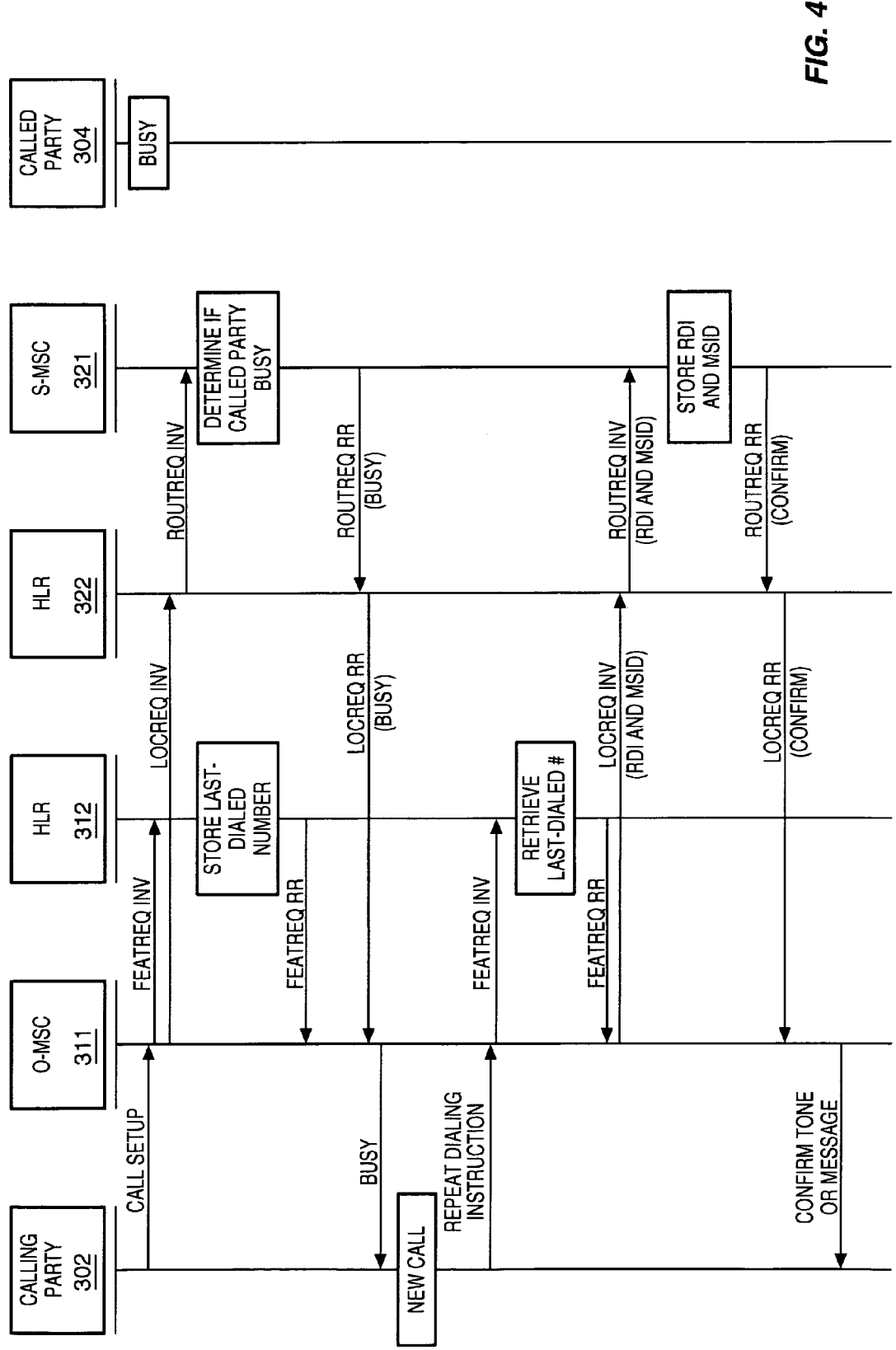
FIGS. 4-6 are message diagrams illustrating processes of activating the repeat dialing feature in the wireless network of FIG. 3 in exemplary embodiments of the invention.
Figure 5:
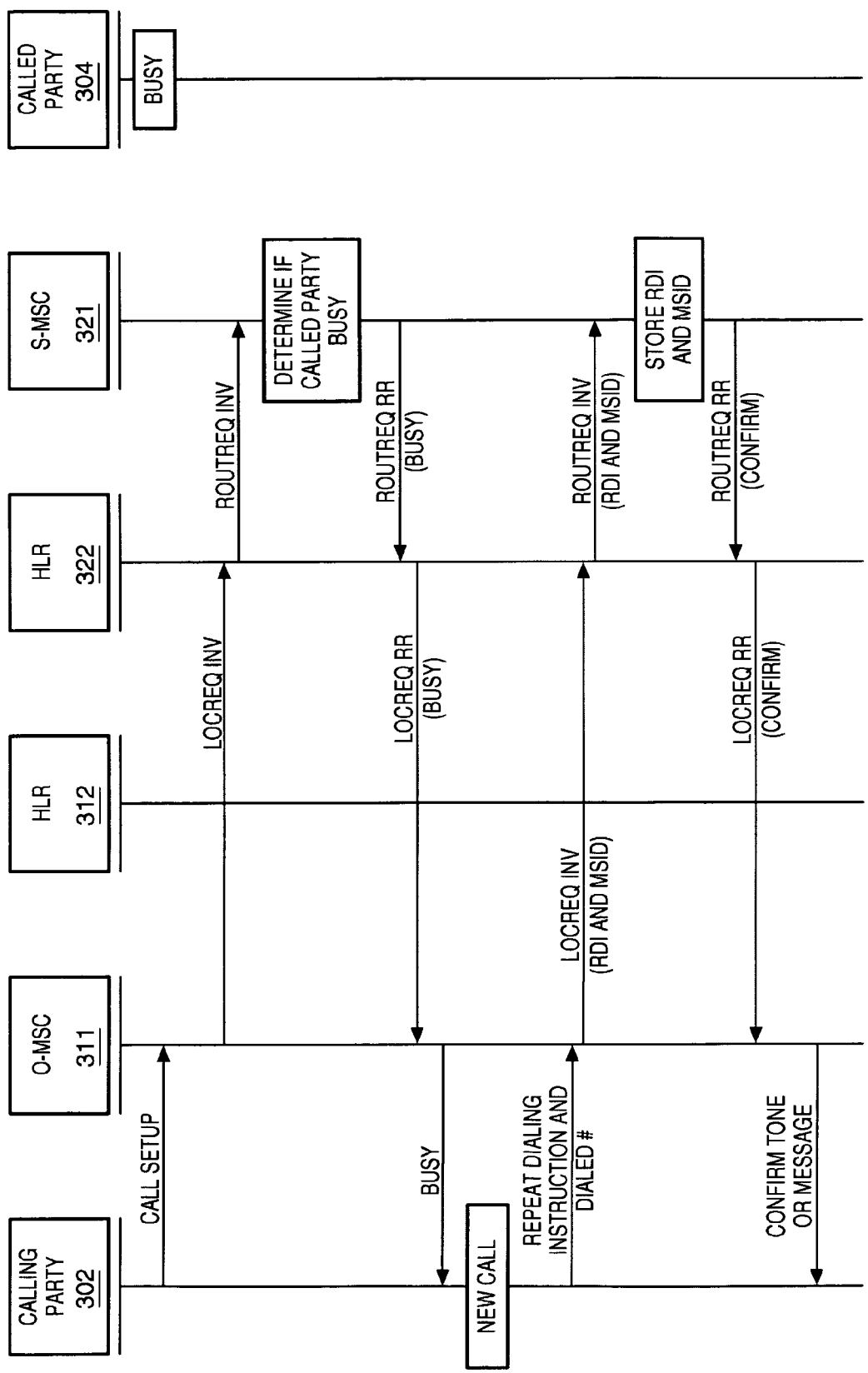
Figure 6:
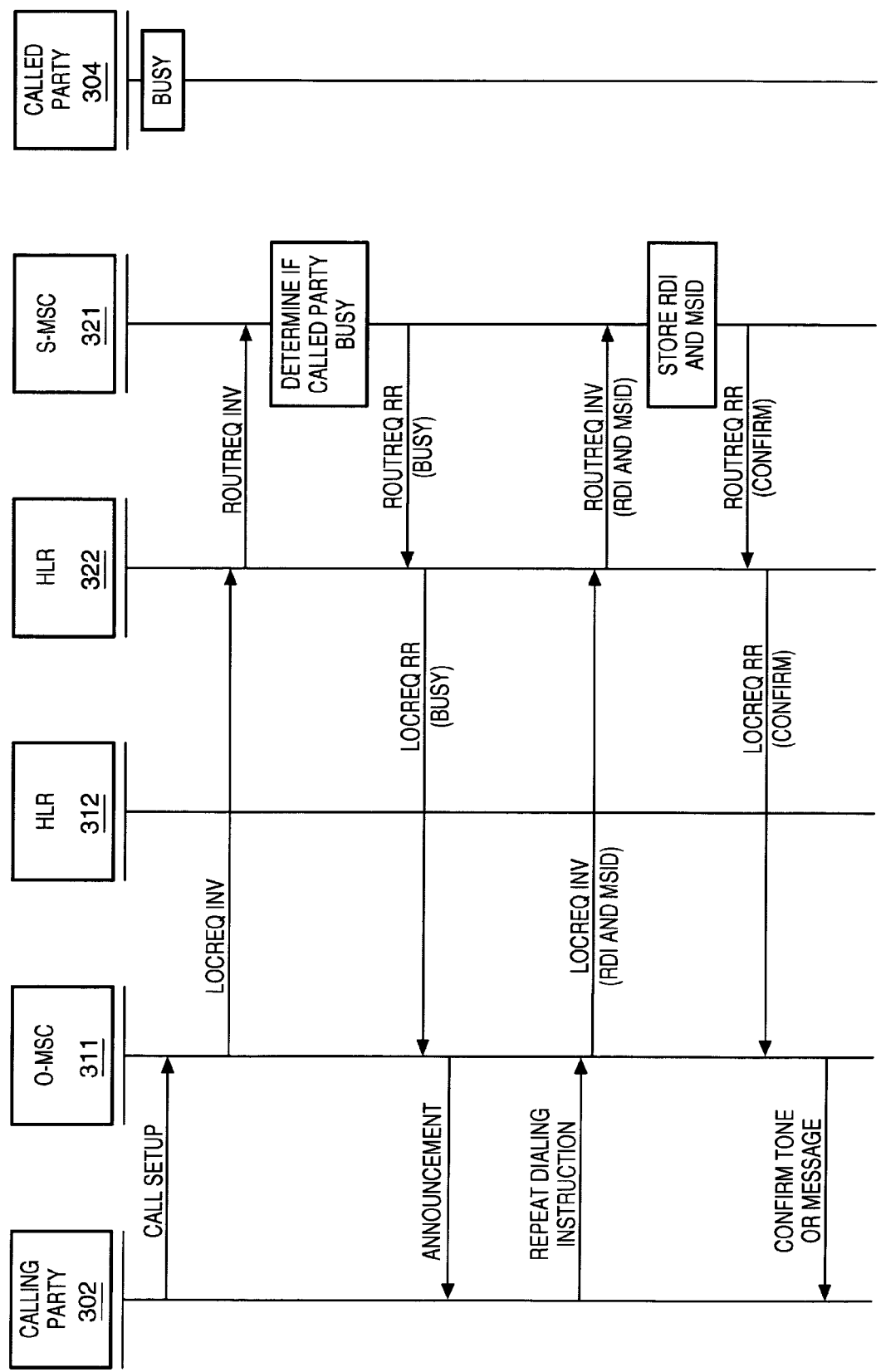

Wireless network 300 provides for repeat dialing of mobile communication devices, such as the device for called party 304. FIGS. 4-6 illustrate three processes to activate the repeat dialing feature in wireless network 300. The invention is not limited to the embodiments in FIGS. 4-6, as the repeat dialing feature may be activated according to other desired processes.

FIG. 4 is a message diagram illustrating a manner of activating the repeat dialing feature in an exemplary embodiment of the invention. In this embodiment, calling party 302 is a subscriber to the repeat dialing feature. The service provider using wireless network 300 offers a repeat dialing feature (most likely for a monthly charge) to which calling party 302 has previously subscribed.

In FIG. 4, calling party 302 initiates a call to called party 304 with a call setup message. O-MSC 311 receives the call setup message. The call setup message includes the dialed number of called party 304. With calling party 302 being a subscriber to the repeat dialing feature, O-MSC 311 automatically transmits a FeatureRequest invoke message (FEATREQ INV) to HLR 312 that includes the number for called party 304. HLR 312 stores the last-dialed number for calling party 302 (which is the number for called party 304), and transmits a FeatureRequest return result message (FEATREQ RR) to O-MSC 311.

O-MSC 311 transmits a LocationRequest invoke message (LOCREQ INV) to HLR 322 serving called party 304. The LocationRequest invoke message is to determine where to route the call. The LocationRequest invoke message may be transmitted in parallel with the FeatureRequest invoke message so that call setup time is not affected by storing the last-dialed number of calling party 102. Responsive to the LocationRequest invoke message, HLR 322 determines that S-MSC 321 is serving called party 304, and transmits a RoutingRequest invoke message (ROUTEREQ INV) to S-MSC 321.

S-MSC 321 receives the RoutingRequest invoke message and determines the availability of called party 304. Because S-MSC 321 determines that called party 304 is busy on a current call, S-MSC 321 transmits a RoutingRequest return result (ROUTREQ RR) to HLR 322 indicating that called party 304 is busy. HLR 322 then transmits a LocationRequest return result message (LOCREQ RR) to O-MSC 311 indicating that called party 304 is busy. O-MSC 311 then transmits a busy message to calling party 302, and calling party 302 hangs up.

If calling party 302 wants to activate the repeat dialing feature to automatically call called party 304 back, then calling party 302 initiates a new call. Calling party 302 enters a repeat dialing instruction to activate the repeat dialing feature. For instance, a repeat dialing instruction may comprise dialing *66 or entering another code. Responsive to receiving the repeat dialing instruction, O-MSC 311 transmits a FeatureRequest invoke message to HLR 312 to retrieve the last-dialed number of calling party 302. HLR 312 retrieves the last-dialed number of calling party 102 and transmits a FeatureRequest return result message to O-MSC 311 that includes the last-dialed number of calling party 302, which is the number for called party 304 in this embodiment.

O-MSC 311 then transmits a LocationRequest invoke message to HLR 322 (the HLR serving called party 304). The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 then transmits a RoutingRequest invoke message to S-MSC 321. The RoutingRequest invoke message includes the repeat dialing indicator and the MSID for calling party 302. S-MSC 321 stores the repeat dialing indicator and the MSID for calling party 302 in call register 323 for called party 304. At this point, repeat dialing is activated.

S-MSC 321 then transmits a RoutingRequest return result message (ROUTREQ RR) to HLR 322 confirming that the repeat dialing feature has been activated. HLR 322 transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

FIG. 5 is a message diagram illustrating another process of activating the repeat dialing feature in an exemplary embodiment of the invention. In this embodiment, calling party 302 is not a subscriber to the repeat dialing feature. Although not a subscriber, calling party 302 is activating the repeat dialing feature on a per-call basis.

In FIG. 5, calling party 302 initiates a call to called party 304 with a call setup message. O-MSC 311 receives the call setup message. O-MSC 311 transmits a LocationRequest invoke message (LOCREQ INV) to HLR 322 serving called party 304. The LocationRequest invoke message is to determine where to route the call. HLR 322 determines that S-MSC 321 is serving called party 304, and transmits a RoutingRequest invoke message (ROUTEREQ INV) to S-MSC 321.

S-MSC 321 receives the RoutingRequest invoke message and determines the availability of called party 304. Because S-MSC 321 determines that called party 304 is busy on a current call, S-MSC 321 transmits a RoutingRequest return result (ROUTREQ RR) to HLR 322 indicating that called party 304 is busy. HLR 322 then transmits a LocationRequest return result message (LOCREQ RR) to O-MSC 311 indicating that called party 304 is busy. O-MSC 311 then transmits a busy message to calling party 302, and calling party 302 hangs up.

Calling party 302 initiates a new call to activate the repeat dialing feature. Calling party 302 enters a repeat dialing instruction followed by a telephone number to be repeat-dialed (the number for called party 304 in this embodiment). For instance, a repeat dialing instruction may comprise dialing *66 followed by the telephone number for called party 304. Even though calling party 302 is not a full-time subscriber to the repeat dialing feature, calling party 302 may activate the feature on a per-call basis. O-MSC 311 receives the repeat dialing instruction and the telephone number from calling party 302. O-MSC 311 then transmits a LocationRequest invoke message to HLR 322 (the HLR serving called party 304). The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 then transmits a RoutingRequest invoke message to S-MSC 321. The RoutingRequest invoke message includes the repeat dialing indicator and the MSID for calling party 302. S-MSC 321 stores the repeat dialing indicator and the MSID for calling party 302 in call register 323 for called party 304. At this point, repeat dialing is activated.

S-MSC 321 then transmits a RoutingRequest return result message (ROUTREQ RR) to HLR 322 confirming that the repeat dialing feature has been activated. HLR 322 transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

FIG. 6 is a message diagram illustrating another process of activating the repeat dialing feature in an exemplary embodiment of the invention. In this embodiment, wireless network 300 uses an announcement to ask calling party 302 whether the repeat dialing feature should be activated.

In FIG. 6, calling party 302 initiates a call to called party 304 with a call setup message. O-MSC 311 receives the call setup message. O-MSC 311 transmits a LocationRequest invoke message (LOCREQ INV) to HLR 322 serving called party 304. The LocationRequest invoke message is to determine where to route the call. HLR 322 determines that S-MSC 321 is serving called party 304, and transmits a RoutingRequest invoke message (ROUTEREQ INV) to S-MSC 321.

S-MSC 321 receives the RoutingRequest invoke message and determines the availability of called party 304. Because S-MSC 321 determines that called party 304 is busy on a current call, S-MSC 321 transmits a RoutingRequest return result (ROUTREQ RR) to HLR 322 indicating that called party 304 is busy. HLR 322 then transmits a LocationRequest return result message (LOCREQ RR) to O-MSC 311 indicating that called party 304 is busy.

O-MSC 311 then transmits an announcement to calling party 302. The announcement informs calling party 302 that called party 304 is busy, and asks calling party 302 if the repeat dialing feature should be activated. For instance, the announcement may be: "The party you have called is busy, please enter a "1" if you would like to activate the repeat dialing feature for a cost of $0.75."

If calling party 302 wants to activate the repeat dialing feature, calling party 302 enters a repeat dialing instruction, such as entering "1" on a keypad. O-MSC 311 receives the repeat dialing instruction from calling party 302. O-MSC 311 has already stored the last-dialed number of calling party 102 in its call register. O-MSC 311 then transmits a LocationRequest invoke message to HLR 322 (the HLR serving called party 304). The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 then transmits a RoutingRequest invoke message to S-MSC 321. The RoutingRequest invoke message includes the repeat dialing indicator and the MSID for calling party 302. S-MSC 321 stores the repeat dialing indicator and the MSID for calling party 302 in call register 323 for called party 304. At this point, repeat dialing is activated.

S-MSC 321 then transmits a RoutingRequest return result message (ROUTREQ RR) to HLR 322 confirming that the repeat dialing feature has been activated. HLR 322 transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

Terminating a Call to a Called Party

Figure 7:
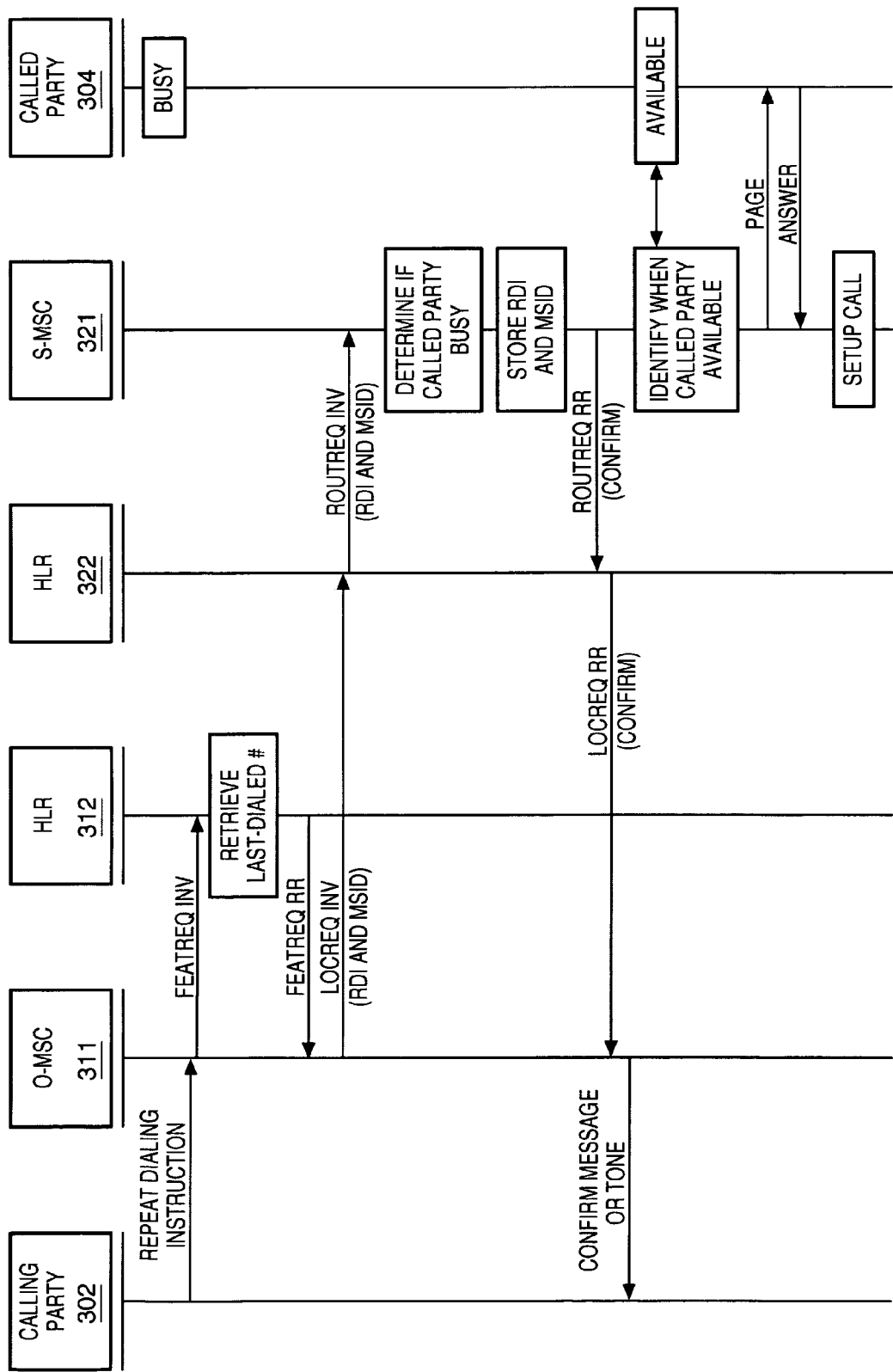
FIG. 7 illustrates a scenario when a called party is stationary or only moves within one MSC in an exemplary embodiment of the invention.
Figure 8:
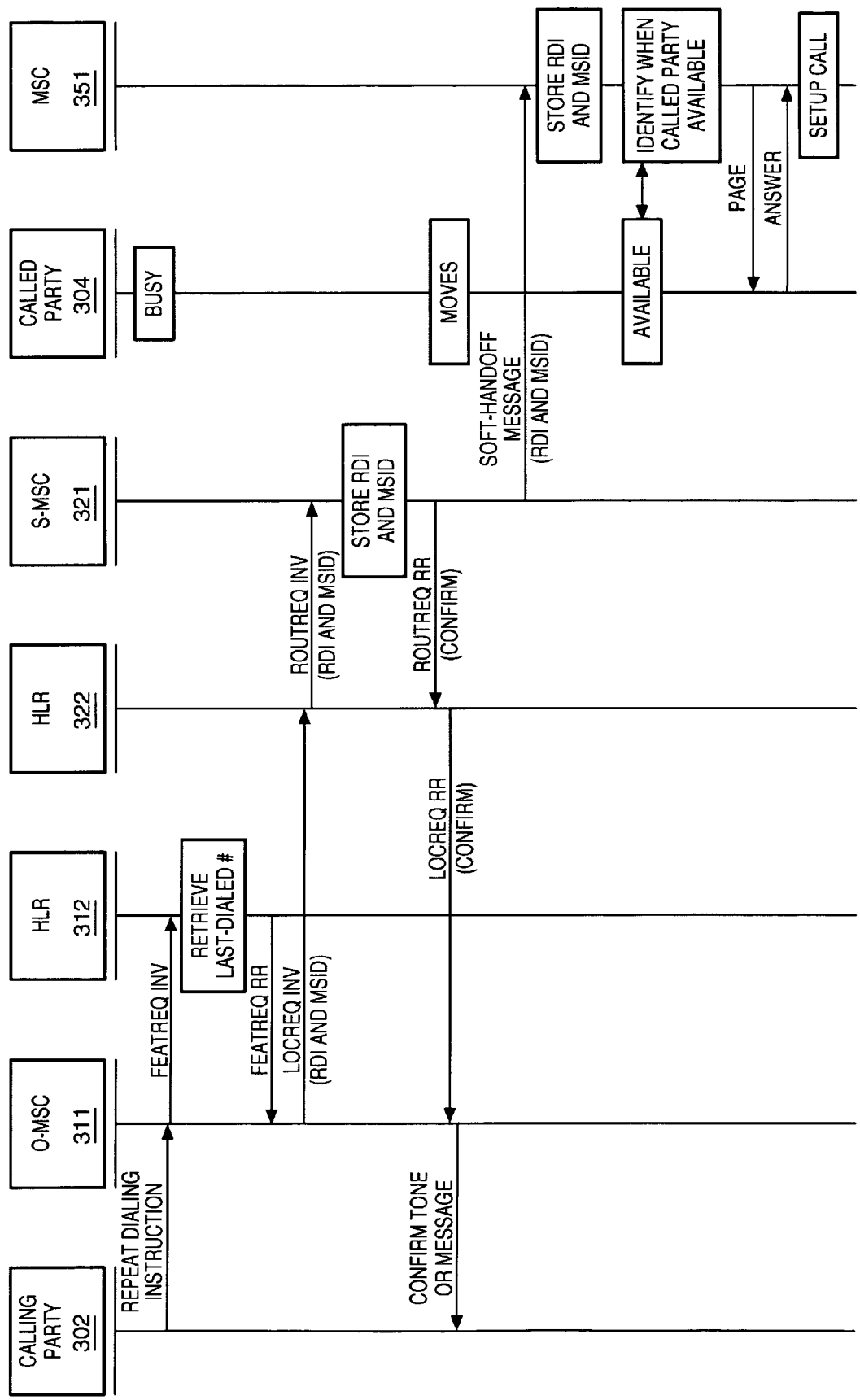
FIG. 8 illustrates a scenario when a called party moves among MSCs that support inter-MSC soft handoffs in an exemplary embodiment of the invention.
Figure 9:
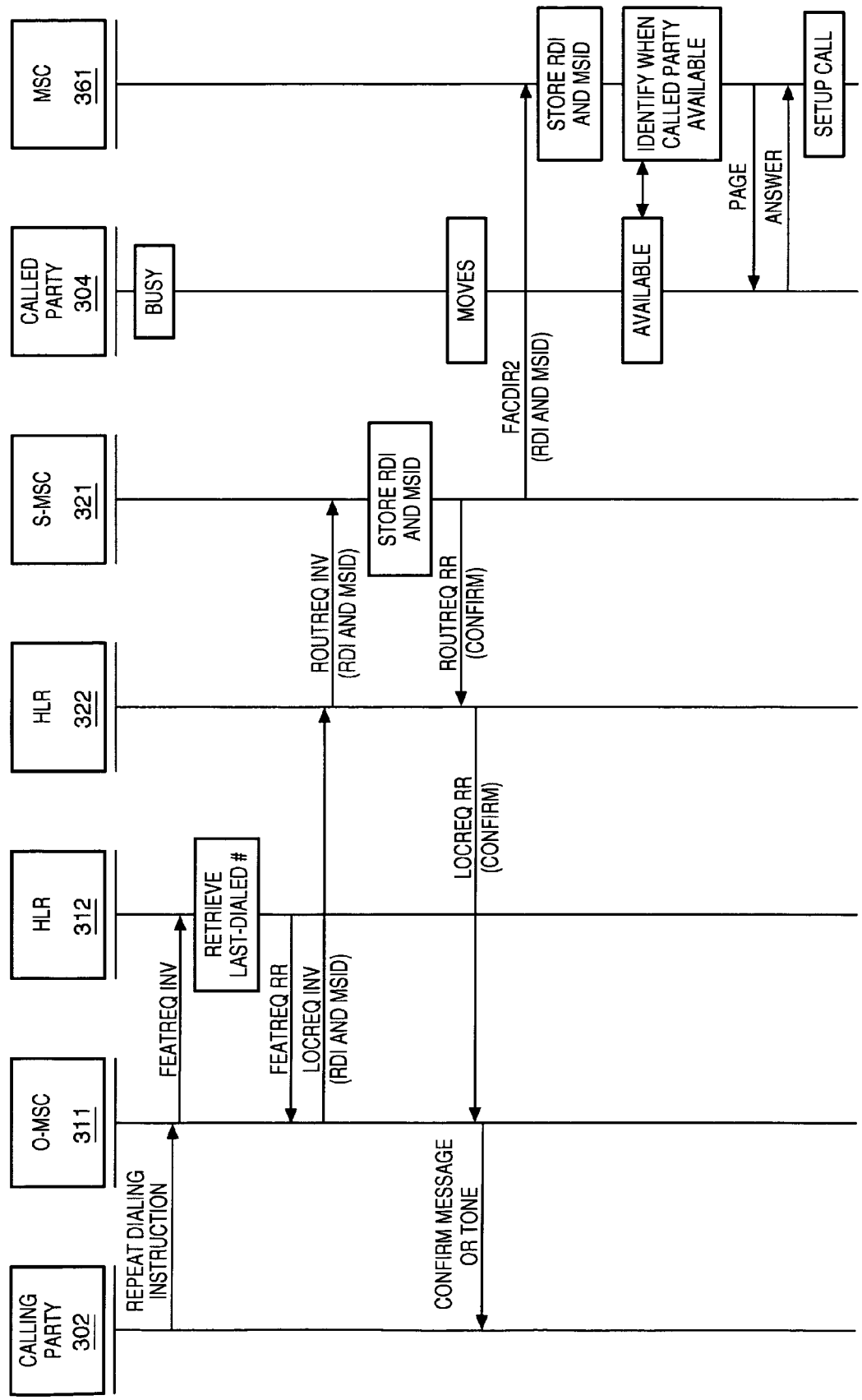
FIG. 9 illustrates a scenario when a called party moves among MSCs that do not support inter-MSC soft handoffs but do support ANSI-41 hard handoffs in an exemplary embodiment of the invention.

FIGS. 7-9 are message diagrams illustrating different scenarios of terminating a call to called party 304 when called party 304 stays within one MSC, when called party 304 moves to another MSC that supports inter-MSC soft handoffs, and when called party 304 moves to another MSC that does not support inter-MSC soft handoffs but does support ANSI-41 hard handoffs. The invention is not limited to the embodiments in FIGS. 7-9.

FIG. 7 illustrates a scenario where called party 304 is stationary or only moves within S-MSC 321 in an exemplary embodiment of the invention. Assume for this embodiment, that calling party 302 placed a call to called party 304, and called party 304 is busy on another call. Responsive to being informed that called party 304 is busy, calling party 302 enters a repeat dialing instruction (such as *66) to activate the repeat dialing feature. O-MSC 311 receives the repeat dialing instruction. Assume for this embodiment that calling party 302 is a subscriber to the repeat dialing feature. Responsive to receiving the repeat dialing instruction, O-MSC 311 transmits a FeatureRequest invoke message (FEATREQ INV) to HLR 312 that is serving calling party 302 to retrieve the last-dialed number of calling party 302. HLR 312 previously stored the last-dialed number of calling party 302 because calling party 302 is a subscriber to the repeat dialing feature (see FIG. 4). HLR 312 retrieves the last-dialed number of calling party 302 and transmits a FeatureRequest return result message (FEATREQ RR) to O-MSC 311 that includes the last-dialed number of calling party 302, which is the number for called party 304 in this embodiment.

O-MSC 311 then transmits a LocationRequest invoke message (LOCREQ INV) to HLR 322 (the HLR serving called party 304). The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 then transmits a RoutingRequest invoke message (ROUTREQ INV) to S-MSC 321. The RoutingRequest invoke message includes the repeat dialing indicator and the MSID for calling party 302. S-MSC 321 stores the repeat dialing indicator and the MSID for calling party 302 in call register 323 for called party 304. At this point, repeat dialing is activated.

S-MSC 321 then transmits a RoutingRequest return result message (ROUTREQ RR) to HLR 322 confirming that the repeat dialing feature has been activated. HLR 322 transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

S-MSC 321 then monitors when called party 304 becomes available in real-time. When S-MSC 321 determines that called party 304 is available (ended the previous call), S-MSC 321 accesses call register 323 for called party 304 to determine if the repeat dialing feature has been activated. In this instance, S-MSC 321 determines that calling party 302 has activated the repeat dialing feature for called party 304.

Therefore, S-MSC 321 transmits a page to called party 304. If S-MSC 321 receives an answer to the page from called party 304, S-MSC 321 attempts to set up a call between calling party 302 and called party 304. If S-MSC 321 is successful, a call is established between calling party 302 and called party 304.

FIG. 8 illustrates a scenario where called party 304 moves among MSCs that support inter-MSC soft handoffs in an exemplary embodiment of the invention. Assume for this embodiment, that calling party 302 placed a call to called party 304, and called party 304 is busy on a another call. Called party 304 is initially busy on the call served by S-MSC 321. The messaging in wireless network 300 is as described in FIG. 7 until called party 304 moves to a location served by MSC 351 instead of S-MSC 321 (see FIG. 3). Also assume that S-MSC 321 and MSC 351 support inter-MSC soft handoffs. When called party 304 has moved, S-MSC 321 transfers a soft handoff message to MSC 351 to handoff the call to MSC 351. The soft handoff message includes the repeat dialing indicator (RDI) and the MSID of calling party 302. MSC 351 stores the repeat dialing indicator and the MSID for calling party 302 in a call register for called party 304.

MSC 351 monitors when called party 304 becomes available in real-time. When MSC 351 determines that called party 304 is available, MSC 351 accesses the call register for called party 304 to determine if the repeat dialing feature has been activated. In this instance, MSC 351 determines that calling party 302 has activated the repeat dialing feature for called party 304. Therefore, MSC 351 transmits a page to called party 304. If MSC 351 receives an answer to the page from called party 304, then MSC 351 attempts to set up a call between calling party 302 and called party 304. If MSC 351 is successful, a call is established between calling party 302 and called party 304.

FIG. 9 illustrates a scenario where called party 304 moves among MSCs that do not support inter-MSC soft handoffs but do support ANSI-41 hard handoffs in an exemplary embodiment of the invention. Assume for this embodiment, that calling party 302 placed a call to called party 304, and called party 304 is busy on another call. Called party 304 is initially busy on the call served by S-MSC 321. The messaging in wireless network 300 is as described in FIG. 7 until called party 304 moves to a location served by MSC 361 instead of S-MSC 321 (see FIG. 3). Assume that called party 304 moves to a location served by MSC 361 instead of S-MSC 321. Also assume that MSC 361 does not support inter-MSC soft handoffs and supports ANSI-41 hard handoffs with S-MSC 321. When called party 304 has moved, S-MSC 321 transfers a hard handoff message, such as an ANSI-41 FACDIR2 message, to MSC 361. The hard handoff message includes a repeat dialing indicator (RDI) and the MSID of calling party 302 in ANSI-41 private extension parameters. MSC 361 stores the repeat dialing indicator and the MSID for calling party 302 in a call register for called party 304.

MSC 361 monitors when called party 304 becomes available in real-time. When MSC 361 determines that called party 304 is available, MSC 361 accesses the call register for called party 304 to determine if the repeat dialing feature has been activated. In this instance, MSC 361 determines that calling party 302 has activated the repeat dialing feature for called party 304. Therefore, MSC 361 transmits a page to called party 304. If MSC 361 receives an answer to the page from called party 304, then MSC 361 attempts to set up a call between calling party 302 and called party 304. If MSC 361 is successful, a call is established between calling party 302 and called party 304.

We claim:

1. A wireless network for providing repeat dialing, the wireless network comprising:

an originating Mobile Switching Center (MSC) system that serves a calling party; and a terminating Mobile Switching Center (MSC) system that serves a called party;

the originating MSC system receives a call from the calling party to the called party, and transmits a call setup message for receipt by the terminating MSC system;

the terminating MSC system receives the call setup message, determines if the called party is available responsive to the call setup message, and transmits a busy message for receipt by the originating MSC system responsive to determining that the called party is busy on another call;

the originating MSC system transmits the busy message to the calling party, receives a repeat dialing instruction from the calling party to activate a repeat dialing feature, and transmits a repeat dialing indicator to the terminating MSC system;

the terminating MSC system receives the repeat dialing indicator, monitors the availability of the called party to identify when the called party becomes available responsive to receiving the repeat dialing indicator, and pages the called party responsive to identifying that the called party has become available to immediately attempt to set up a call between the called party and the calling party at the terminating side as soon as the called party becomes available.

2. The wireless network of claim 1 wherein:

the terminating MSC system stores the repeat dialing indicator and a Mobile Station Identifier (MSID) of the calling party in a call register for the called party, and accesses the call register for the called party responsive to determining that the called party has become available to determine if the repeat dialing feature has been activated.

3. The wireless network of claim 1 wherein:

the terminating MSC system monitors the availability of the called party to identify when the called party becomes available in real-time.

4. The wireless network of claim 1 wherein:

the calling party comprises a mobile calling party or a wire line calling party.

5. The wireless network of claim 1 further comprising a Home Location Register (HLR) system of the calling party, wherein:

the originating MSC system stores the last-dialed number of the calling party in the HLR system, retrieves the last-dialed number of the calling party from the HLR system responsive to receiving the repeat dialing indicator, and transmits the repeat dialing indicator to the terminating MSC system for the called party.

6. The wireless network of claim 1 wherein:

the originating MSC system receives the repeat dialing instruction and a dialed number for the called party from the calling party, and transmits the repeat dialing indicator to the terminating MSC system for the called party.

7. The wireless network of claim 1 wherein:

the originating MSC system plays an announcement to the calling party that the called party is busy on another call, receives the repeat dialing instruction responsive to the announcement, and transmits the repeat dialing indicator to the terminating MSC system for the called party.

8. A method of operating a wireless network for providing repeat dialing, the wireless network comprising an originating Mobile Switching Center (MSC) system that serves a calling party and a terminating Mobile Switching Center (MSC) system that serves a called party, the method comprising:

receiving a call from the calling party in the originating MSC system;

transmitting a call setup message from the originating MSC system for receipt by the terminating MSC system;

determining if the called party is available in the terminating MSC system responsive to the call setup message;

transmitting a busy message from the terminating MSC system for receipt by the originating MSC system responsive to determining that the called party is busy on another call;

transmitting the busy message from the originating MSC system to the calling party responsive to receiving the busy message from the terminating MSC system;

receiving a repeat dialing instruction in the originating MSC system from the calling party to activate a repeat dialing feature;

transmitting a repeat dialing indicator from the originating MSC system to the terminating MSC system;

monitoring the availability of the called party to identify when the called party becomes available in the terminating MSC system responsive to receiving the repeat dialing indicator; and paging the called party with the terminating MSC system responsive to identifying that the called party has become available to immediately attempt a call between the called party and the calling party at the terminating side as soon as the called party becomes available.

9. The method of claim 8 further comprising:

storing the repeat dialing indicator and a Mobile Station Identifier (MSID) for the calling party in a call register for the called party in the terminating MSC system; and accessing the call register for the called party responsive to determining that the called party has become available to determine if the repeat dialing feature has been activated.

10. The method of claim 8 wherein monitoring the availability of the called party to identify when the called party becomes available comprises:
   monitoring the availability of the called party to identify when the called party becomes available in real-time.

11. The method of claim 8 wherein:
   the calling party comprises a mobile calling party or a wire line calling party.

12. The method of claim 8 wherein the wireless network further comprises a Home Location Register (HLR) system of the calling party, the method further comprising:
   storing the last-dialed number of the called party in the HLR system;
   retrieving the last-dialed number of the calling party from the HLR system responsive to receiving the repeat dialing indicator; and
   transmitting the repeat dialing indicator from the originating MSC system to the terminating MSC system for the called party.

13. The method of claim 8 further comprising:
   receiving the repeat dialing instruction and a dialed number for the called party from the calling party in the originating MSC system; and
   transmitting the repeat dialing indicator to the terminating MSC system for the called party.

14. The method of claim 8 further comprising:
   playing an announcement from the originating MSC system to the calling party that the called party is busy on another call;
   receiving the repeat dialing instruction in the originating MSC system from the calling party responsive to the announcement; and
   transmitting the repeat dialing indicator to the terminating MSC system for the called party.

15. A wireless network for providing repeat dialing, the wireless network comprising:
   an originating Mobile Switching Center (O-MSC) that serves a calling party; and
   a serving Mobile Switching Center (S-MSC) that serves a called party;
   the O-MSC receives a call from the calling party to the called party and transmits a call setup message to the S-MSC;
   the S-MSC determines if the called party is available responsive to the call setup message, and transmits a busy message to the O-MSC responsive to determining that the called party is busy on another call;
   the O-MSC transmits the busy message to the calling party responsive to receiving the busy message from the S-MSC;
   the O-MSC receives a repeat dialing instruction from the calling party to activate a repeat dialing feature, and transmits a repeat dialing indicator to the S-MSC;
   the S-MSC receives the repeat dialing indicator, monitors the availability of the called party in real time to identify when the other call ends, pages the called party responsive to identifying that the called party has become available, and re-dials the called party if an answer to the page is received from the called party to immediately attempt to set up a call between the called party and the calling party at the terminating side as soon as the called party becomes available.

16. The wireless network of claim 15 wherein:
   the S-MSC stores the repeat dialing indicator and a Mobile Station Identifier (MSID) for the calling party in a call register for the called party, and accesses the call register for the called party responsive to identifying that the other call ended to determine if the repeat dialing feature has been activated.

17. The wireless network of claim 15 wherein:
   the wireless network further comprises another Mobile Switching Center (MSC) adapted to provide soft handoffs with the S-MSC, wherein if the called party moves to a location served by the other MSC, then:
   the S-MSC transmits a soft handoff message to the other MSC that includes a repeat dialing indicator and a Mobile Station Identifier (MSID) for the calling party; and
   the other MSC receives the repeat dialing indicator and the MSID, monitors the availability of the called party in real time to identify when the other call ends, and re-dials the called party responsive to identifying that the other call ended and responsive to determining that the repeat dialing feature has been activated for the called party based on the repeat dialing indicator.

18. The wireless network of claim 15 wherein:
   the wireless network further comprises another Mobile Switching Center (MSC) system that does not provide for soft handoffs with the S-MSC but does provide for hard handoffs, wherein if the called party moves to a location served by the other MSC, then:
   the S-MSC transmits an ANSI-41 hard handoff message to the other MSC that includes a repeat dialing indicator and a Mobile Station Identifier (MSID) for the calling party; and
   the other MSC receives the repeat dialing indicator and the MSID, monitors the availability of the called party in real time to identify when the other call ends, and re-dials the called party responsive to identifying that the other call ended and determining that the repeat dialing feature has been activated for the called party based on the repeat dialing indicator.

* * * * *